United States Patent [19]

Hain

[11] 4,387,132

[45] Jun. 7, 1983

[54] HEAT TRANSFER PAPER

[75] Inventor: Paul Hain, Hamilton, Ohio

[73] Assignee: Champion International Corporation, Stamford, Conn.

[21] Appl. No.: 220,469

[22] Filed: Dec. 29, 1980

[51] Int. Cl.³ ...... B32B 3/10; B41M 5/26; D06P 5/15

[52] U.S. Cl. .......................................... 428/211; 8/471; 106/210; 162/177; 162/181.8; 428/207; 428/342; 428/448; 428/452; 428/454; 428/508; 428/514; 428/535; 428/536; 428/537; 428/913; 428/914

[58] Field of Search .............. B32B/3/10; 8/471, 919; 282/27.5; 428/306-308, 326, 331, 533, 913, 914, 452, 454, 195, 207, 211, 219, 340-342, 448, 449, 508, 514, 522, 535-537, 212; 106/19, 20, 25, 210, 214, 212; 162/175, 181.8, 177

[56] References Cited

U.S. PATENT DOCUMENTS

| | | | |
|---|---|---|---|
| 2,500,972 | 3/1950 | Wilson | 428/452 |
| 2,641,557 | 6/1953 | Green | 106/214 |
| 2,713,307 | 7/1955 | Adams | 106/214 |
| 3,597,304 | 8/1971 | Baldwin et al. | 162/181.8 |
| 3,843,383 | 10/1974 | Ishie et al. | 282/27.5 |
| 3,993,500 | 11/1976 | Isaac et al. | 106/288 B |
| 4,054,718 | 10/1977 | Garner et al. | 282/27.5 |
| 4,087,284 | 5/1978 | Golden et al. | 282/27.5 |
| 4,093,415 | 6/1978 | Defago et al. | 8/471 |

FOREIGN PATENT DOCUMENTS

| | | | |
|---|---|---|---|
| 2852125 | 6/1979 | Fed. Rep. of Germany | 106/214 |
| 2029591A | 3/1980 | United Kingdom | 282/27.5 |

*Primary Examiner*—Bruce H. Hess

*Attorney, Agent, or Firm*—Evelyn M. Sommer

[57] ABSTRACT

Heat transfer paper is provided having applied to at least one surface thereof from about ½ to 5 pounds per side of a high-volume, liquid swellable material selected from the group consisting of clays and starches.

2 Claims, No Drawings

HEAT TRANSFER PAPER

This invention relates to improved heat transfer paper. More particularly, this invention relates to preparation of a heat transfer paper which retains the inks used in the transfer process at the very surface thereof thereby enabling improved transfer of the ink to the ultimate surface to be printed.

Transfer processes, i.e., processes involving the physical transfer of a design or pattern from one substrate to another, generally can take several forms. Thus, a design or pattern can be printed onto paper employing a molten pigmented resin which sets on cooling to give a hard permanent print. The printed paper is then heated in pressure contact with a second substrate, e.g., paper, fabrics, textiles, etc., whereupon the resin melts and is at least partially transferred to said second substrate as the mirror image of the original pattern.

Alternatively, a paper substrate can be coated with a film of a heat tackifiable resin which is slightly water soluble. A design or pattern is then imparted to said film using a pigmented ink. The printed paper is then heated in pressure contact with a second substrate and the resulting tacky film bearing the pattern adheres to said second substrate. The original paper substrate is then dampened and withdrawn from the resinous film leaving the pattern on the second substrate.

Lastly, and perhaps most frequently, a transfer paper is printed with inks containing dyestuffs capable of sublimation. The printed transfer paper is then heated in pressure contact with a second substrate whereupon the dyes vaporize and transfer to the second substrate in image configuration. The dyes absorb and chemically combine with the second substrate and are dried and fixed thereon by further heating.

The present invention pertains to improvements in transfer papers suitable for use in this latter sublimation transfer process. The dyestuffs employed are those which have the property of sublimation, i.e., going from a solid to a vapor or gas, at temperatures below the melting point of the substrate material to which the image is to be transferred. Suitable dyes for use in the present invention include conventional disperse dyes, which dyes are well known to the art, and include the anthraquinoid dyestuffs, such as hydroxyanthraquinones and/or aminoanthraquinones, azo dyestuffs, quinophthalone dyestuffs, styryl dyestuffs or nitrodiarylamines and the like. Such dyestuffs have the common feature of an absence of water solubilizing groups, however, such dyes are, for the most part, thermosoluble in synthetic polymers. Such dyestuffs are suitable for dyeing substrates formed of cellulosic materials such as paper as well as polyamides, polyesters, acrylics, polypropylene and acetates. Suitable dyestuffs for such purposes are well known and are disclosed, for example, in U.S. Pat. Nos. 3,707,346 and 3,632,291, the pertinent portions of which are incorporated herein by reference.

The sublimable dyestuffs, in the form of water based inks, i.e., very fine dispersions of sublimable organic pigments in water are applied to the transfer paper in image configuration by conventional printing techniques such as rotary screen printing, rotary gravure, and the like, and then dried. To effect the transfer process, the transfer paper thus printed is brought into contact with the cellulosic or synthetic polymeric substrate to be printed upon and kept at the sublimation temperature under pressure until the image on the transfer paper has been transferred to the other substrate. This can generally be achieved by a relatively short period of heating, e.g., from about 10 to 60 seconds at a temperature in the range of from about 150° to 240° C. at a pressure ranging from about 5 to 20 psi. The transfer printing process may be carried out continuously on a heated roller, cylindrical screen or by means of a heated platen or with the use of steam or dry, warm air under atmospheric pressure or in vacuo. Generally, it is not necessary to subject the printed substrate to any post treatment such as washing or steaming either to fix the dyestuff on the printed substrate or to remove any unfixed dyestuff.

The particular conditions employed will, of course, vary according to the particular dyestuffs employed and the nature of the substrate on to which image transfer is to be effected.

It has been found, especially in connection with the rotary screen printing process, that when images are applied to transfer sheets, relatively few problems arise upon subsequent transfer when the image printed is comprised of high intensity, dark colors or very light tints; however, if the image is comprised of intermediate shades such as pastel colors and especially the grey/green shades, the image printed is not a clear, sharp halftone but rather a smeared pattern. The rotary screen printing process generally tends to produce less precise halftone images and to smear between the halftone dots. The pastels show this imperfection more because they have more white area and the ink has enough color intensity to contrast sharply with the white background. The result is a mottled effect which is aesthetically unacceptable after transfer to another substrate such as cloth.

Accordingly, it is an object of the present invention to provide improved heat transfer paper.

It is another object of the present invention to provide heat transfer paper which can be effectively printed with dark, intermediate and light colors.

It is still another object of the present invention to provide an improved transfer process resulting in high fidelity.

These as well as other objects and advantages are accomplished by the present invention which comprises a heat transfer paper having applied to at least one surface thereof a high volume, liquid swellable material such as clays and absorbent starches which will start to swell immediately upon contact with the water based inks typically employed in the rotary screen printing process effectively trapping the pigment particles in such inks at the surface of the heat transfer paper in a uniform manner. Uniformity of ink distribution is effected in accordance with the present invention since the swelling action fills and plugs many of the voids in the transfer paper surface thereby providing a more uniform surface. Due to the obtainment of a highly uniform distribution of the ink at the very surface of the transfer paper, a much more uniform transfer of the image to the receiving substrate is effected.

The high volume, liquid swellable materials suitable for use in the present invention include montmorillonite clays such as bentonite, and the like as well as absorbent starches such as the "super slurper" starches which very quickly absorb many times their original dry weight of water, in particular the "super slurper" starch known as G.P.C. Polymer 35-A-100 available from Grain Products Company. These starches are starch-acrylonitrile graft copolymers. They are characterized by their ability to very quickly absorb many times their original dryweight of water. It has been found that the liquid swellable materials are highly effective in accomplishing the objectives of the present invention when applied in relatively small quantities of from about ½ to 5 pounds per side. These materials can be easily applied to the heat transfer paper employing conventional paper processing machinery. Thus, for example, the material can be applied as an aqueous dispersion, alone, or as part of the sizing solution on a size press or coater. The "super slurper" starch materials may advantageously be applied dry from a fluid bed adapted to contact the previously wetted surface of the transfer paper.

By applying a high volume, liquid swellable material to at least one surface of the heat transfer paper in accordance with the present invention, the surface volume of the transfer paper becomes immediately substantially plugger upon printing thereby changing the surface characteristics of the transfer paper so that there is an essentially instantaneous halt to the surface penetration of the dyestuff particles. Moreover, since the transfer process occurs in the vapor phase, the amount of dye transferred is very sensitive to the distance of the dyestuff from the substrate to be printed. Thus, since the heat transfer paper obtained in accordance with present invention carries the image on the very surface thereof, the transfer efficiency of the transfer process, both in terms of ink efficiency and transfer rate, is also markedly improved.

The high volume, liquid swellable material can be conveniently applied as an aqueous dispersion containing up to about 10% by weight of said material. Alternatively, the material can be added to the sizing solution. Thus, for example, an aqueous sizing solution can be employed containing up to about 10% by weight of said material and from about 0.5 to 5% by weight of a sizing material such as carboxymethyl cellulose, polyvinyl alcohol, starch and the like.

The following examples illustrate the preparation of heat transfer paper in accordance with the present invention and the enhanced transfer efficiency obtained in the transfer process through use thereof.

EXAMPLE 1

A sizing solution was prepared in the conventional manner but containing 4.5% bentonite (Georgia Kaolin 101) and 0.5% carboxymethylcellulose. This provided an approximate applied weight of 0.4 pounds bentonite per ream. The sizing solution was applied to the paper employing conventional paper processing machinery—a printed pattern was then applied using rotary gravure techniques and a broad range of colors and color values. Sharp, mottle-free transfers were uniformly effected to a fabric substrate.

EXAMPLE 2

Example 1 was repeated but in this instance, the sizing solution contained 0.3% bentonite and 0.2% carboxymethylcellulose to give an applied weight of approximately 0.8 pounds bentonite per ream. The heat transfer paper, in use, produces a very uniform, sharply defined transfer of the image to the fabric substrate.

What is claimed is:

1. A heat transfer paper for the enhancement of clear, sharp, precise images in printing processes employing a water based ink containing a sublimable dyestuff, said paper being coated on at least one surface thereof with a high volume liquid material in an approximate weight of from 0.4 pounds to 0.8 pounds per ream and selected from a group consisting of starch-acrylonitrile graft copolymers which very quickly absorb many times their original dry weight of water and montmorillonite clays, said high volume liquid swellable material being applied on conventional paper processing machinery from an aqueous sizing solution consisting of from about 0.3% to about 10% by weight of said liquid swellable material and about 0.5% to about 5% by weight of a conventional sizing material, said coated paper having images printed thereon using a water based ink containing at least one sublimable dyestuff, said liquid swellable material swelling upon contact with the water based ink trapping the dyestuff at the surface of said heat transfer paper in a uniform manner.

2. A heat transfer paper according to claim 1 wherein said group member is a montmorillonite clay.

* * * * *